Patented Oct. 31, 1939

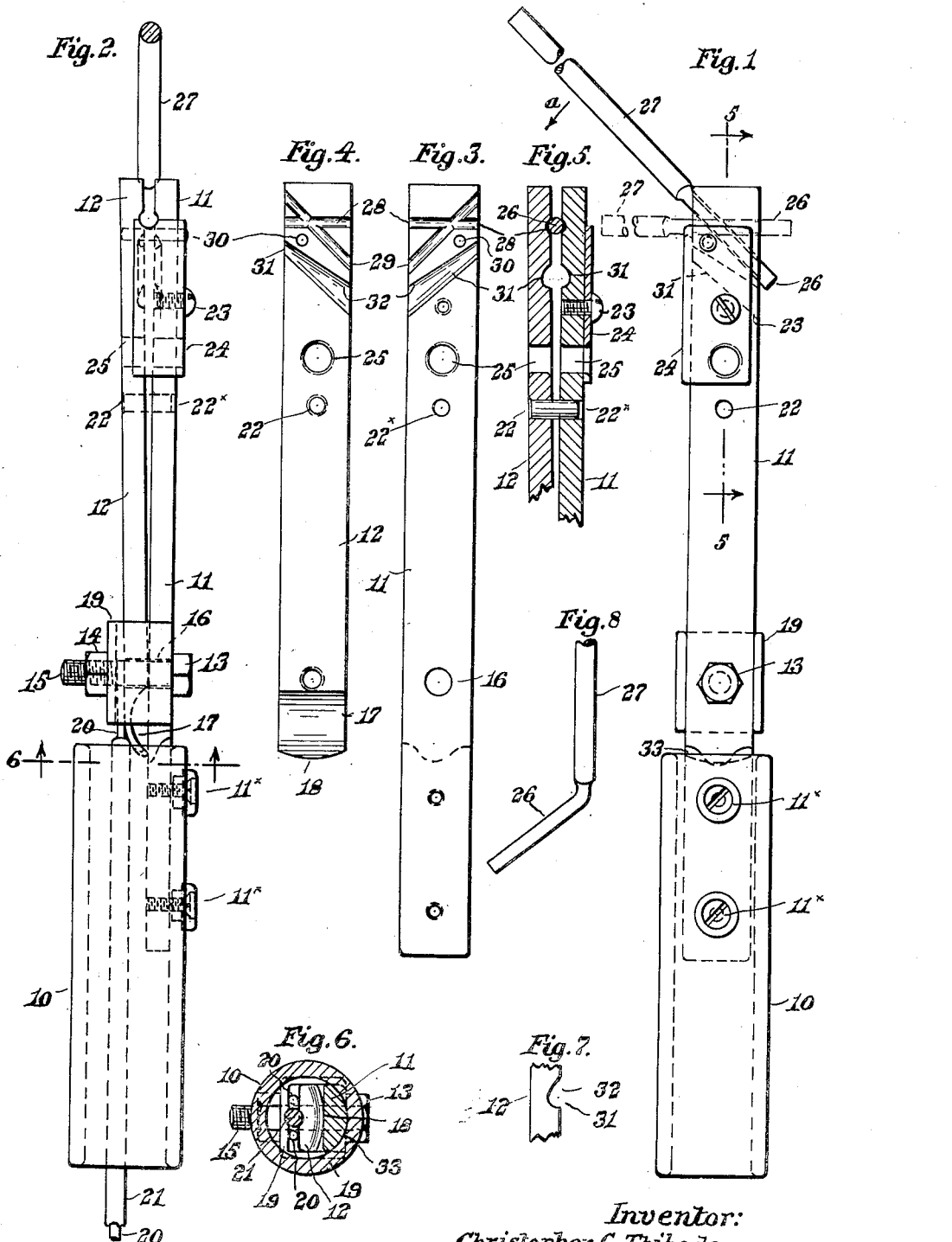

2,178,292

UNITED STATES PATENT OFFICE 2,178,292

ELECTRIC WELDING TONGS

Christopher G. Thibodeau, Everett, Mass.

Application May 31, 1938, Serial No. 210,852

8 Claims. (Cl. 219—8)

This invention relates to tongs for use in arc welding and particularly to manually supported tongs in which the welding electrodes are firmly gripped during the welding operation.

In manual electric arc welding the article to be welded is connected to one pole of an electric current supply, while the electrode in the tongs is connected to another pole of the same electric current supply.

It is essential that the electric wire or electrode should be firmly gripped by the tongs and held closely enough to the article being operated on to complete the circuit through an arc, the intense heat of which will melt and fuse the work and electrode to form a weld.

The object of the present invention is to provide a simple construction of tongs adapted to grip the welding wire or electrode in various positions, the gripping pressure being obtained by means of a gradually reduced arcuate portion at the end of one of the gripping bars, said arcuate portion forming a springlike part which normally retains the two bars of the tongs in contact.

Another object of the invention is to provide the adjacent faces of the two bars of the tongs with registering channels forming a conical hole to receive one end of the welding wire or electrode, the larger ends of these channels having camlike surfaces extending towards the forward end of the bars with which the electrode when rocked about a pin extending through the bars will spread said bars apart permitting the insertion of electrodes between gripping grooves formed in the adjacent faces of said bars.

A further object of the invention is to so construct the welding tongs that when a new electrode is inserted in the channels and moved forward, it will not only spread the bars apart but will also remove the remains of used electrodes, thus permitting the new electrode to be moved into the gripping grooves ready for use in the welding operation.

Another object of the invention is to provide an opening extending through the bars in which the end of an electrode may be inserted when it is desired to bend the end of an electrode to an angle to the body portion thereof.

A further object of the invention is the provision of a guard plate which will straddle the space between the two bars when the electrode is being used in the welding operation to prevent any spatters of the welding material entering or passing through the space between the bars.

A further object of the invention is the provision of means for clamping to one of the bars strands of the electric cable extending to the source of electric supply.

These objects are accomplished by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing

Figure 1 represents a plan of an electric welding tongs embodying the features of the present invention.

Figure 2 represents a side elevation of the same.

Figure 3 represents an elevation of one of the bars forming the tongs and showing the gripping grooves and electrode channel formed in the inner face thereof.

Figure 4 represents an elevation of the other bar of said tongs and showing gripping grooves and electrode channel adapted to coact with the grooves and channel of the other bar.

Figure 5 represents a section of the outer ends of the tongs with the bars thereof spread apart, said section being on line 5, 5 on Fig. 1.

Figure 6 represents a transverse section on line 6, 6 on Fig. 2.

Figure 7 represents an enlarged detail showing the shape of the upper end of the electrode channel, and Figure 8 represents an elevation of one of the electrodes with its end bent at an angle to the body portion thereof.

Similar characters indicate like parts throughout the several figures of the drawing.

In the drawing, 10 represents a tubular handle preferably formed of Bakelite or some similar insulating material.

To the inner wall of this handle 10 is secured a bar 11 by means of the screws 11x, and normally contacting with the inner face of the bar 11 is another bar 12.

The bar 12 is secured to the bar 11 by means of a bolt 13 and nut 14.

The shank 15 of the bolt 13 is slightly less in diameter than the diameter of the holes 16 through which said shank extends.

The lower end 17 of the bar 12 is reduced in thickness toward the end thereof and is made arcuate to form a spring, the tension of which is sufficient to retain the bars 11 and 12 in contact under normal conditions.

The lower edge 18 is curved as shown in Fig. 4 of the drawing and the center portion thereof bears upon the inner face of the bar 11.

By making this edge 18 curved as stated, the bar 12 may be rocked to a slight degree relative to the inner face of the bar 11.

Straddling the two bars 11, 12 is a U-shaped member 19 through the bridge portion of which the shank 15 of bolt 13 extends.

Between the bridge portion of this U-shaped member and the outer face of the bar 12 are clamped strands 20 of an electric cable 21 extending through the interior of the handle 10.

The bar 12 has secured thereto a registering pin 22 extending into an opening 22x in the bar 11.

Secured to the bar 11 by means of the screw 23 is an L-shaped guard plate 24 which prevents the spatters formed during the electric welding operation from entering the space between the bars 11 and 12 when said bars are spread apart.

Through the bars 11 and 12 and also through the guard plate 24 are alined holes 25 in which may be positioned the lower end 26 of a welding electrode 27 so that said lower end 26 may be bent at any angle to the body portion of said electrode, as shown in Fig. 8.

The outer ends of the inner faces of the bars 11 and 12 are provided with electrode gripping grooves 28 extending transversely of said bars and said inner faces are also provided with other angularly disposed gripping grooves 29, all as shown in Figs. 3 and 4 of the drawing.

The grooves 28 and 29 on one bar are adapted to be disposed opposite to and register with the grooves 28 and 29 on the other bar.

Adjacent to the gripping grooves 28 and 29 is a pin 30 secured to the bar 11 and extending through a hole in the bar 12.

Substantially tangential to the pin 30 each bar 11, 12 is provided with a tapered channel 31, these channels being adapted to register with each other when the bars 11, 12 are in contact and form a cone-shaped hole to receive the end 26 of a welding electrode.

The wider end of each channel 31 is provided with a cam surface 32 on the side towards the outer ends of the bars 11, 12.

There is sufficient spring in the arcuate portion 17 of the bar 12 to retain the bars 11 and 12 in contact under normal conditions.

When it is desired to use the tongs to grip an electrode 27 prior to the welding operation, the end 26 of an electrode is inserted into the larger end of the registering channels 31 and is then moved toward the end of the bars 11 and 12, rocking in this movement about the pin 30.

When the end 26 comes into contact with and rides over the cam surfaces 32, it will spread apart the two bars 11 and 12.

Continued movement of the electrode 27 toward the end of the tongs will cause it to rock about the pin 30 until the end 26 thereof comes into alinement with the grooves 29 when the spring pressure of the arcuate end 17 of the bar 12 will force the two bars together and firmly grip the end 26 of the electrode in the position shown in full lines in Fig. 1 of the drawing.

If it is desired to have the electrode 27 held in the position at right angles to the bars 11, 12, as shown in dotted lines in Fig. 1, the electrode 27 may be moved further in the direction of the arrow a on Fig. 1 of the drawing until the end 26 of said electrode enters the grooves 28, when it will be gripped firmly between the two bars 11, 12 as shown in Fig. 5 of the drawing.

In order to remove a used electrode 27, another electrode 27 may be inserted in the channels 31 and moved toward the end of the bars 11, 12 and as this is accomplished the bars will be again spread apart and when the new electrode comes into contact with the old electrode 27, it will force it from between the gripping bars 11, 12.

During this operation of removing the old electrode in the manner just described, the new electrode will contact with the inner faces of the gripping bars 11, 12 and thoroughly clean the inner faces of the bars of any sediment or spatters which may have lodged between the two bars.

It is obvious that in a tool of this description an electric current passes from the cable 21 to the bar 12 and the welding electrode 27, the circuit being completed by the contact of the outer end of the electrode 27 with the article being welded, to which is connected another cable from the source of electricity.

This construction of electric welding tongs is very effective in operation and owing to its simplicity there are few parts to get out of order.

It dispenses with all pivoted levers and coiled springs such as are generally used in devices of this character.

Inasmuch as the tongs have no outwardly extending levers, it is capable of being used in many restricted places where it would be difficult to use most tongs now in general use.

The outer face of the bar 11 at its lower end is curved as at 33 to fit the inner wall of the handle 10, all as shown in Fig. 6 of the drawing.

The screws 11x extend through headed bushings 34 of insulating material, the shanks of which are tightly driven into depressions in the wall of the handle 10, all as shown in dotted lines in Fig. 2 of the drawing.

The outer ends of these screws are seated deeply in the heads of these bushings 34.

It is believed that the operation and many advantages of the invention will be understood without further description.

Having thus described my invention, I claim

1. An electric welding tongs comprising two flat bars having on their inner faces coacting grooves to grip a welding electrode, said bars being retained normally in contact under spring pressure, a handle for said tongs, a pin extending through said bars and between the edges thereof, and oppositely disposed inclined channels in adjacent faces of said bars and substantially tangential to said pin, said channels combined forming a hole to receive the end of the welding electrode prior to the movement of said electrode into said gripping grooves.

2. An electric welding tongs as set forth in claim 1, in which the upper ends of said channels are wider than the lower ends and have cam surfaces extending toward the outer ends of said bars and coacting with said electrode to separate the bars during the movement of said electrode into the gripping grooves.

3. An electric welding tongs as set forth in claim 1, in which one of said bars is immovable and the other bar is movable relatively to the immovable bar, the outer end of the immovable bar being provided with a guard plate straddling the space between the bars when said bars are spread apart.

4. An electric welding tongs as set forth in claim 1, in which the inner end of one bar is reduced in thickness and formed arcuate with its edge in contact with the other bar.

5. An electric welding tongs as set forth in claim 1, in which the inner end of one bar is reduced in thickness and formed arcuate with its edge transversely curved with the center of said edge in contact with the other bar to permit slight sidewise rocking movement of one bar relatively to the other bar.

6. An electric welding tongs as set forth in claim 1, in which the inner end of one bar is reduced in thickness and formed arcuate with its edge curved with the center of said edge in contact with the other bar and a bolt to secure the two bars together, said bolt being positioned above the reduced inner end of the first mentioned bar.

7. An electric welding tongs as set forth in claim 1, in which one of the bars is fixed and the other movable, said movable bar being adapted to be moved away from the fixed bar by the forward contra-clockwise movement of an electrode disposed in said channels.

8. An electric welding tongs as set forth in claim 1, in which one bar may be moved away from the other bar and old electrodes removed from the tongs by the forward contra-clockwise movement of a new electrode disposed in said channels and in said forward movement rocking about said pin.

CHRISTOPHER G. THIBODEAU.